United States Patent
van der Ploeg et al.

(10) Patent No.: US 9,917,656 B1
(45) Date of Patent: Mar. 13, 2018

(54) AM NOISE CANCELLATION IN VEHICLES

(71) Applicant: NXP B.V., Eindhoven (NL)

(72) Inventors: Hendrik van der Ploeg, Son en Breugel (NL); Erik Keukens, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/614,286

(22) Filed: Jun. 5, 2017

(51) Int. Cl.
*H04H 20/47* (2008.01)
*H04B 15/00* (2006.01)
*H04B 1/12* (2006.01)
*G10K 11/175* (2006.01)
*H04B 1/3822* (2015.01)

(52) U.S. Cl.
CPC ......... *H04B 15/005* (2013.01); *G10K 11/175* (2013.01); *H04B 1/126* (2013.01); *H04B 1/3822* (2013.01)

(58) Field of Classification Search
CPC .... H04B 15/005; H04B 1/126; H04B 1/3822; G10K 11/175
USPC .............. 381/2, 4, 11, 15, 86; 348/607, 729, 348/E5.096
See application file for complete search history.

(56) References Cited

U.S. PATENT DOCUMENTS

2008/0012990 A1* 1/2008 Kitamura ................. H04B 1/30
 348/607
2009/0195701 A1* 8/2009 Fujishima ................ H01Q 1/24
 348/729

* cited by examiner

*Primary Examiner* — Paul S Kim
*Assistant Examiner* — Friedrich W Fahnert
(74) *Attorney, Agent, or Firm* — Rajeev Madnawat

(57) ABSTRACT

A device to cancel noise in broadcast signal is disclosed. The device a first port to connect to a main antenna, a second port to connect to a noise antenna, a processor coupled to the first port and the second port to measure the broadcast signal received at the first port and a noise signal received at the second port to derive a first set of coefficients, a first adaptive filter coupled to the first port and the processor and a second adaptive filter coupled to the second port and the processor. The first adaptive filter and the second adaptive filters are configurable based on the first set of coefficients to remove the high energy parts of a frequency spectrum of signals received at the first port and the second ports respectively. The device also includes a subtraction coefficient calculator module coupled to the first filter and the second filter to derive a second set of coefficients and a subtractor coupled to the first port, the second port and the subtraction coefficient calculator module to subtract the noise signal from the broadcast signal.

8 Claims, 1 Drawing Sheet

US 9,917,656 B1

AM NOISE CANCELLATION IN VEHICLES

BACKGROUND

The use of electronic components in vehicles has been on the rise since. Newer vehicles, specially hybrid or electrical power vehicles use a substantial amount of electronic circuits. These electronic circuits and the vehicle engine emit noise in amplitude modulation (AM) band and this noise causes interference with AM reception that can be typically found in most vehicles. Typically, AM frequency bands are also used for AM reception as well as digital radio broadcast.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, device to cancel noise in broadcast signal is disclosed. The device a first port to connect to a main antenna, a second port to connect to a noise antenna, a processor coupled to the first port and the second port to measure the broadcast signal received at the first port and a noise signal received at the second port to derive a first set of coefficients, a first adaptive filter coupled to the first port and the processor and a second adaptive filter coupled to the second port and the processor. The first adaptive filter and the second adaptive filters are configurable based on the first set of coefficients to remove the high energy parts of a frequency spectrum of signals received at the first port and the second ports respectively. The device also includes a subtraction coefficient calculator module coupled to the first filter and the second filter to derive a second set of coefficients and a subtractor coupled to the first port, the second port and the subtraction coefficient calculator module to subtract the noise signal from the broadcast signal.

In some embodiments, the first adaptive filter and the second adaptive filter are configured to remove the high energy parts of a frequency spectrum of signals received at the first port and the second ports respectively based on the first set of coefficients. The second set of coefficients are derived from outputs of the first filter and the second filter. The subtractor is configured to apply the second set of coefficients on signals received on the first port and the second port and the subtracting of the noise signal from the broadcast signal is performed based on the second set of coefficients. The subtraction coefficient calculator is configured to calculate a current error and based on the current error, a filter coefficient is calculated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure.

For removing noise from amplitude modulation (AM) broadcast signal, a noise antenna or probe may be used and based on the signals from the noise antenna and inherent constant phase of AM broadcast signal, a signal subtraction technique may be employed to remove the noise. However, this technique fails when there is a noise that includes varying phase signals such as digital radio signals. The embodiments described herein uses one or more noise antennas along with processing modules and filters that removes non-correlated signals from an AM broadcast signal.

Figure 1:
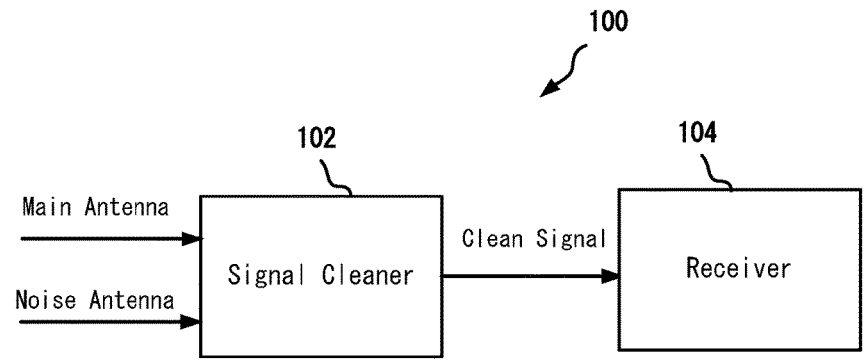
FIGS. 1 and 2 depict block diagrams of a system for reducing noise using a noise antenna in accordance with one or more embodiments of the present disclosure.

FIG. 1 illustrates a block diagram of a system 100 for reducing noise in an AM signal. The system 100 includes a coupling to couple to a main antenna and a coupling to connect to one or more noise probes that are placed in a vehicle. The location and orientation of the noise probe or probes is decided based on the location of the potential noise sources. An AM antenna measure the incoming radio frequency (RF) signal compared to the ground plane. Typically, the vehicle body provides a stable reference. However, in newer vehicles, especially, electrical powered vehicles, the ground plane is distorted by electrical components such as transformers. In some embodiments, the noise probe is placed pointing towards earth.

The system 100 includes a signal cleaner module 102. The signal cleaner module 100 may include a plurality of adaptive filters that can be controlled using adaptive coefficients. The system 100 may be coupled to a radio receiver 104. An adaptive filter is a system with a linear filter that has a transfer function controlled by variable parameters and a means to adjust those parameters according to an optimization algorithm (e.g., least mean square (LMS) algorithm). A transfer function is a mathematical representation of outputs of an adaptive filter in relationship with the inputs thereto.

Figure 2:
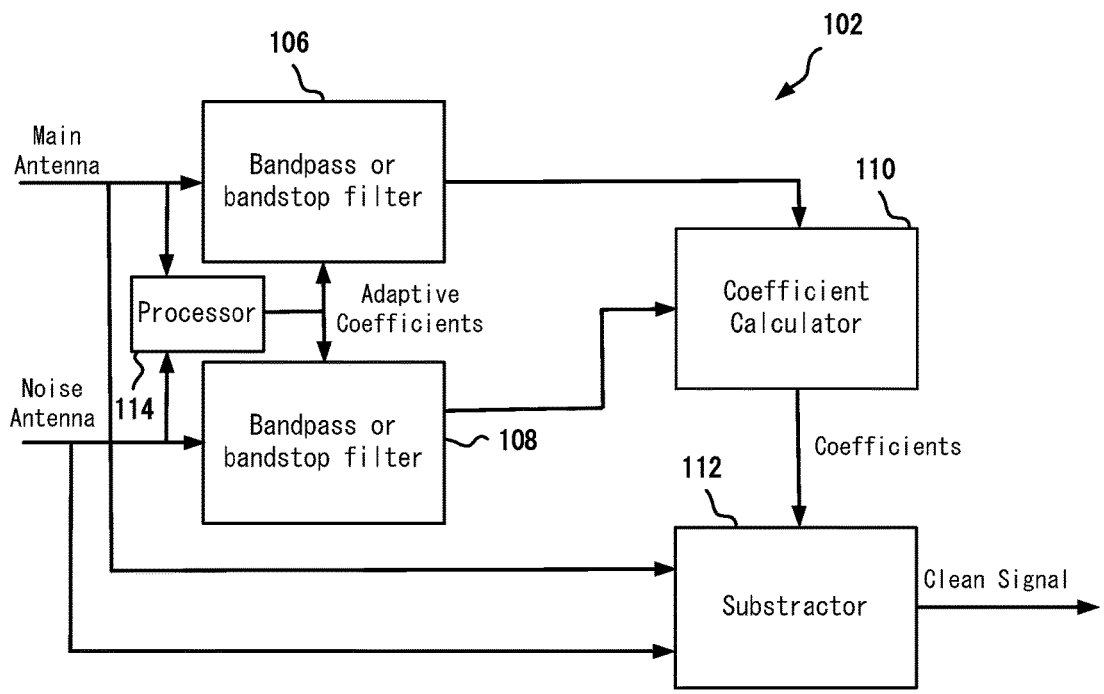

FIG. 2 is a block diagram of the signal cleaner module 102. In some embodiments, the signal cleaner module 102 may employ signal correlation technique to identify noise signals that are not correlated to the AM broadcast signal and adjust one or more filters to remove the noise based on correlation and comparison of the AM signal with the signal from the noise probe. Note that the term AM signal is used herein just as an example for easy understanding of the embodiments herein. A person skilled in the art would appreciate that the embodiments described herein may also be used for cleaning up digital broadcast signals. The signal cleaner module 102 includes a first bandpass or bandstop filter (the first filter) 106 coupled to the main antenna and a second bandpass or bandstop filter (the second filter) 108 coupled to the noise antenna. In some embodiments, there a signal processor 114 is provided to analyze the AM signal and the noise signal to determine adaptive coefficients and based on the adaptive coefficients, the first filter 106 and the second filter 108 are adjusted. In some embodiments, the first filter 106 and the second filter 108 may also be low pass filters. Based on the measurements energy of spectrum, the processor 114, provides adaptive coefficients to the first filter 106 and the second filter 108 to shift frequency. The coefficients may also be calculated based on energy measurements per spectral component in the AM signal and the noise signal to find the area with the least energy and a bandpass filter may be defined based on such measurements. If a bandpass filter approach is used, a plurality of stop bands may be defined based on energy measurements per spectral component.

To measure the area or areas of the least energy, Fourier analysis may be used to decompose the AM signal into a number of discrete frequencies, or a spectrum of frequencies over a continuous range. Outputs of the first filter 106 is only part or parts of spectrum with no AM signal but only the frequency of the low energy area of the spectrum. In other words, the AM signal is removed from input AM signal spectrum by the first filter 106.

Outputs of the first filter 106 and the second filter 108 are inputted to a subtraction coefficient calculator module 110. The subtraction coefficient calculator module 110 may use blind source separation (BSS) or least mean square (LMS) algorithms to derive a set of coefficients. Either both BSS and LMS methods may be used or any one of the BSS and LMS methods.

The AM signal received at the subtraction coefficient calculator module 110 is a mixed signal the includes the low energy regions of the original broadcast signal mixed with the low energy areas of the noise signal, which can be represented as a set of mixed signals $x(t)=(x_1(t), \ldots x_n(t))^T$. The subtraction coefficient calculator module 110 separates the set of mixed signals x(t) through the determination of un-mixing matrix, to recover an approximation of the original signals. LMS algorithms may be used in the subtraction coefficient calculator module 110 to mimic a desired filter by finding filter coefficients that relate to producing the least mean square of the error signal (difference between the desired and the actual signal). The subtraction coefficient calculator module 110 works starting with a set of coefficients and updates those coefficients iteratively to find coefficients that provides an optimal filter. These coefficients, which may be complex gain and may also include a component to compensate for a phase difference, are provided to a subtractor 112 that subtracts the noise signal from the AM signal based on the input complex number to provide a clean output. These coefficients may also be applied to incoming antenna signals. These coefficients are calculated from signals from filters 106, 108. However, these coefficients are applied on the original signals from the antennas so no information of the antenna signals is lost by the filtering.

The subtractor 112 may perform spectral subtraction independently on different bands based on the input coefficients from the subtraction coefficient calculator module 110. The input coefficients may represent spectral noise estimates which may be calculated through the Fourier transformation process in the coefficient calculator module 110.

The coefficient calculator module 110 may calculate the coefficients as follows:

First the current error is calculated using EQ. 1.

$$e^*(n) = x_M(n) - \hat{h}(n)x_N(n)$$ EQ1:

Where h is the filter response and the adaptive filter is defined by the vector $\hat{h}(n)$. x denotes an input signal. Subscript M denotes main antenna and N denotes noise antenna. Based on the current error, the coefficient update, at time n+1, is calculated using EQ. 2.

$$\hat{h}(n+1) = \hat{h}(n) + \mu x_N(n)e^*(n)$$ EQ. 2:

The above equations are for example only. In these examples, the frequency response of the input circuit is flat, thus only one complex coefficient value suffices.

In some examples, the normalized least mean square (NLMS) algorithm may be used to normalize to the signal amplitude. In such examples, the application of normalization changes the coefficient formula (at time n+1) to:

$$\hat{h}(n+1) = \hat{h}(n) + \frac{\mu e^*(n)x(n)}{x^H(n)x(n)}$$

Where H denotes transposition.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description.

The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A device to cancel noise in a broadcast signal, the device comprising:
    a first port to connect to a main antenna;
    a second port to connect to a noise antenna;
    a processor coupled to the first port and the second port to measure the broadcast signal received at the first port and a noise signal received at the second port to derive a first set of coefficients;
    a first adaptive filter coupled to the first port and the processor;
    a second adaptive filter coupled to the second port and the processor, wherein the first adaptive filter and the second adaptive filters are configurable based on the first set of coefficients;
    a subtraction coefficient calculator module coupled to the first filter and the second filter to derive a second set of coefficients; and
    a subtractor coupled to the first port, the second port and the subtraction coefficient calculator module to subtract the noise signal from the broadcast signal.

2. The device of claim 1, wherein the first adaptive filter and the second adaptive filter are configured to remove the high energy parts of a frequency spectrum of signals received at the first port and the second ports respectively based on the first set of coefficients.

3. The device of claim 1, wherein the second set of coefficients are derived from outputs of the first filter and the second filter.

4. The device of claim 3, wherein the subtractor is configured to apply the second set of coefficients on signals received on the first port and the second port.

5. The device of claim 1, wherein the subtracting of the noise signal from the broadcast signal is performed based on the second set of coefficients.

6. The device of claim 1, wherein the subtraction coefficient calculator is configured to calculate a current error and based on the current error, a filter coefficient is calculated.

7. The device of claim 1, wherein the current error is calculated using equation:

$$e^*(n) = x_M(n) - \hat{h}(n)x_N(n)$$

where h^(n) defines the first filter and x represents the broadcast signal.

8. The device of claim 7, wherein the first set of coefficients, at time n+1, are calculated based on the current error using the equation:

$$\hat{h}(n+1) = \hat{h}(n) + \mu x_N(n)e^*(n).$$

* * * * *